July 15, 1924.
H. ROBINSON
SLICING MACHINE
Filed Feb. 19, 1924       2 Sheets-Sheet 1
1,501,810
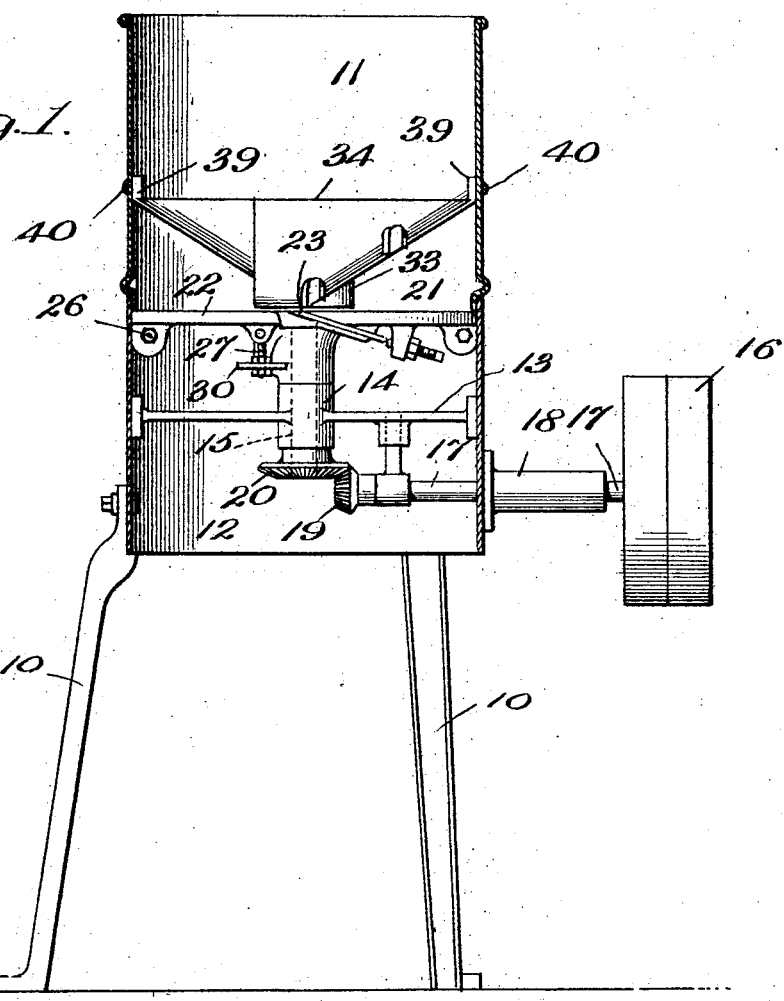
Fig. 1.
Fig. 2.
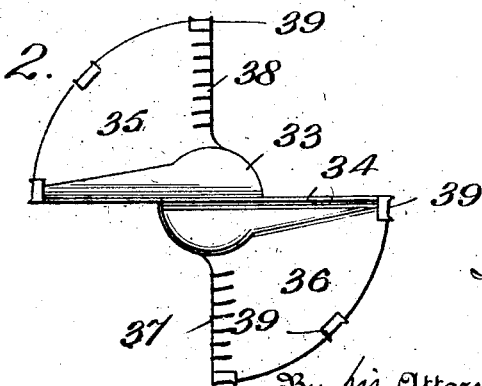
Henry Robinson
Inventor
By his Attorney July 15, 1924.
H. ROBINSON
SLICING MACHINE
Filed Feb. 19, 1924
1,501,810
2 Sheets-Sheet 2
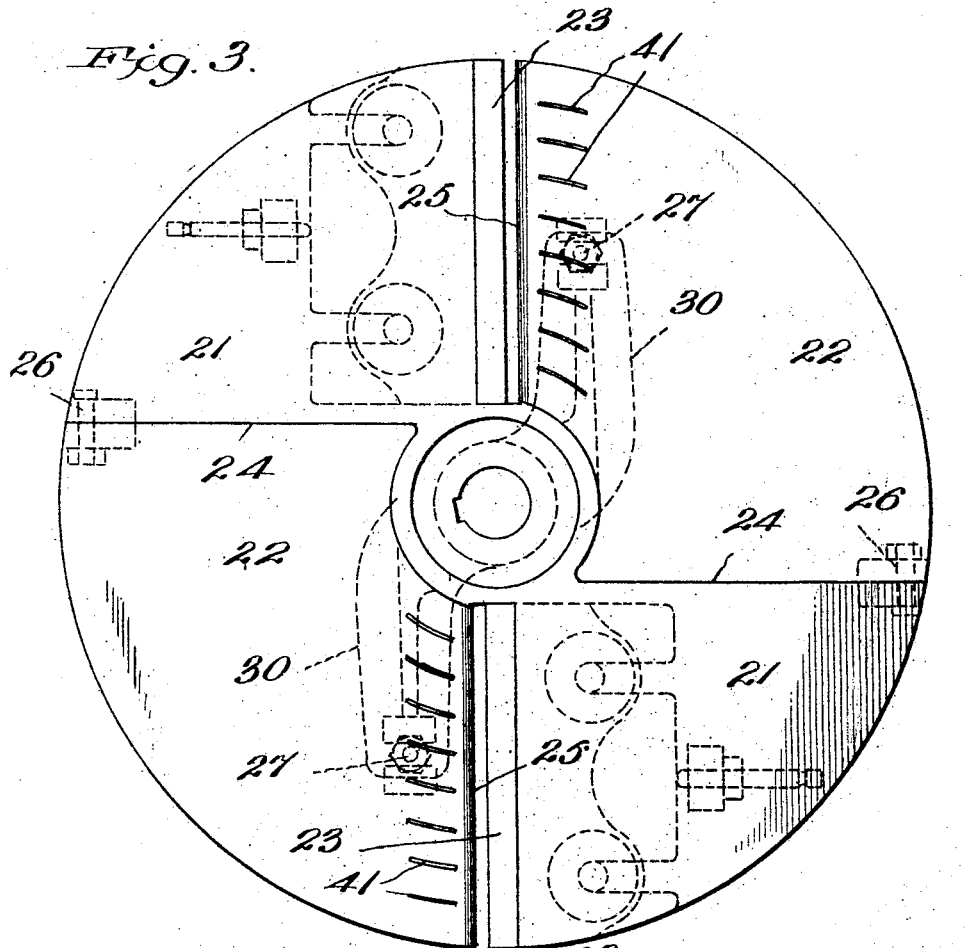
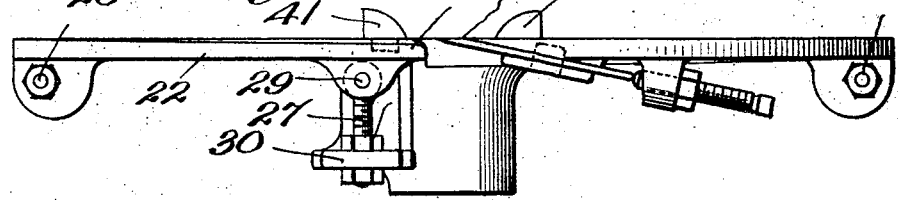
Henry Robinson
Inventor
By his Attorney Patented July 15, 1924.

1,501,810

UNITED STATES PATENT OFFICE.

HENRY ROBINSON, OF LINDENHURST, NEW YORK.

SLICING MACHINE.

Application filed February 19, 1924. Serial No. 693,739.

*To all whom it may concern:*

Be it known that I, HENRY ROBINSON, a citizen of the United States, residing in Lindenhurst, Long Island, New York, have invented certain new and useful Improvements in Slicing Machines, of which the following is a specification.

The present invention relates to an improved vegetable slicing and cutting machine by the operation of which potatoes, beets, carrots, turnips, etc., are sliced without material breakage of the slices, and are discharged from below the cutting element as fast as the slices are formed. It is one advantage of this machine that the thickness of the slices produced can be quickly and easily regulated within a comparatively wide range.

Another advantage of the machine is found in the fact that it lends itself readily to the cutting of vegetables into strips, as for "French fried" potatoes, for instance that the machine may be used for forming either slices or strips.

A preferred form of the invention is shown in the accompanying drawings, in which Figure 1 is a side elevation of the machine with half of the casing removed to show the interior. Figure 2 is a top plan view of directing abutment, Figure 3 is a plan view of the cutting element, Figure 4 is a side elevation of the same, and Figure 5 shows a part of the same in elevation as seen at right angles to the view in Figure 4.

The main casing of the machine is preferably supported upon the legs 10, and is preferably made in two parts 11 and 12, the latter directly attached to the legs and the former fitting down on the part 12 as shown in Figure 1.

Within the lower part 12 is fixed a spider 13, having a hub 14 serving as a bearing for the shaft 15 of the revolving cutting element. A pulley 16 on the shaft 17 carried in the bearing 18, drives the shaft 15 through the medium of two beveled gears 19 and 20.

The cutting element carried on the shaft 15 has a fixed, and preferably horizontal and plane portion 21 and an inclined or inclinable portion 22. This latter is preferably movable so as to permit of regulating the thickness of the slices cut, but it is within the broad invention to make the same fixed in position where only one thickness of slice is desired.

It is preferred to form each cutting element, as shown with two fixed portions 21 on opposite sides of the element and two corresponding inclined portions placed between the fixed portions on each side.

Each fixed portion of the cutting element has one substantially radial edge supplied with an adjustable knife 23, and another edge 24 at right angles to the knife edge which latter fits snugly against one edge of the inclined portion corresponding to the opposite knife.

Each inclined portion of the cutting element, in addition to the edge at 24, has another straight edge 25 placed parallel with one of the knives 23 and preferably rounded, as shown. Each of these inclined portions is mounted on a pivotal pin 26 located close to the circular perimeter of the cutting element on the edge 24; and near its edge 25 each portion 22 is supported in the manner shown in Figures 4 and 5. For this purpose a pin 27 is pivotally connected with the part 22 by means of the ears 28 and pin 29. The pin 27 is preferably threaded and is adjustably supported on a bracket 30 by means of two nuts 31 and 32. When the nuts 31 and 32 are properly manipulated, the pin 27 is raised or lowered and the part 22 tilts around an axis parallel to the edge 25 and knife 23. This makes it possible to vary the position of the part 22 so as to regulate the thickness of the slice that is cut, while always preserving the parallelism of the edge 25 and the corresponding knife 23.

It will be seen that the structure described involves a radical departure from the types of rotary slicers hitherto in use, in that instead of regulating the thickness of the slices produced by raising and lowering the knives, this regulation is accomplished by raising and lowering the surface of the disc opposite each knife in such a way as always to preserve the parallelism of the opposed edges. The result of this is that the slices are never bent as they pass under the knives, and comparatively thick slices can therefore be cut without danger of breaking.

The upper portion 11 of the stationary casing is provided with a stationary member which serves to lead or direct the vegetables onto the cutting member, and also to provide an abutment against which the vegetables are crowded by the action of the cutter, so that the knife 23 may be made effective. It may, therefore, be appropriately called a "directing abutment."

The preferred form of this part of the machine is clearly shown in Figures 1 and 2. As there shown, it includes a central hub 33 which tapers upward and expands laterally to an edge 34 at the top, which occupies a diametrical position within the cylinder 11. Viewed in plan, this feature includes two wings 35 and 36 which occupy diametrically opposite quadrants (although wings covering an angle other than a right angle are within the invention). The outer edges of these wings preferably fit against the inner surface of the cylinder and sweep downward from the extremities of the edge 34 to the respective extremities of the lower, horizontal, wing edges 37 and 38; which, together with the bottom of the hub 33, come very close to the top face of the cutting element. Lugs 39 are preferably provided, by means of which the whole device may be secured to the casing 11 by bolts 40.

Upon charging the machine, the vegetables are dropped into the top of the casing 11, and those that fall upon either wing (as 35) tend to slide off at right angles to its edge, and thus crowd the vegetables lying on the revolving cutting member under the other wing (as 36). The action of the cutting member aids in this crowding against the under side of the wings which act by virtue of their sloping position to force the vegetables down the inclined portion 22 of the cutting member and against the revolving knives. The thickness of the resulting slices will depend upon the degree of inclination of the portion 22 of the cutting member; and, owing to the position of the knives and the ample space afforded immediately in front of each knife, the slices will never be materially bent. There will, therefore, be substantially no breakage of the slices.

The operation is continuous, as the machine can be charged while the cutter is operating, the sliced vegetables dropping from the bottom as fast as they are charged at the top.

If it is desired to cut the vegetables into strips, as for "French fried" potatoes, additional parallel upright blades 41 may be provided in the inclined portions 22 of the cutting member. They should be curved and placed at right angles to both the part 22 and the knives 23, and the height of these blades 41 need be only as great as the maximum thickness of slice desired. Preferably these blades are removably inserted in the cutting member, so that a given machine may be useful for forming either slices or strips at will.

This apparatus may be modified in many ways without departing from the scope of the invention, which is not limited to the details herein shown and described.

What is claimed is—

In a slicing machine a casing and a revoluble cutting element comprising in combination a fixed knife bearing portion, a portion pivotally mounted on said fixed portion, a bracket under the cutting element, and a pin supported by said bracket and pivotally connected with the pivotally mounted portion aforesaid.

In testimony whereof I have hereto set my hand on this 11th day of February, 1924.

HENRY ROBINSON.